United States Patent
Goto

(10) Patent No.: US 12,275,403 B2
(45) Date of Patent: Apr. 15, 2025

(54) VEHICLE, CONTROL METHOD FOR A VEHICLE AND NON-TRANSITORY COMPUTER STORAGE MEDIUM

(71) Applicant: TOYOTA JIDOSHA KABUSHIKI KAISHA, Toyota (JP)

(72) Inventor: Hiroki Goto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 510 days.

(21) Appl. No.: 17/652,838

(22) Filed: Feb. 28, 2022

(65) Prior Publication Data

US 2022/0340134 A1 Oct. 27, 2022

(30) Foreign Application Priority Data

Apr. 27, 2021 (JP) .................................. 2021-075172

(51) Int. Cl.
*B60W 30/00* (2006.01)
*B60W 30/16* (2020.01)

(52) U.S. Cl.
CPC ..... *B60W 30/16* (2013.01); *B60W 2554/4042* (2020.02); *B60W 2554/802* (2020.02); *B60W 2554/804* (2020.02); *B60W 2720/106* (2013.01); *B60W 2754/30* (2020.02)

(58) Field of Classification Search
CPC ......... B60W 30/16; B60W 2554/4042; B60W 2554/802; B60W 2554/804; B60W 2720/106; B60W 2754/30; B60W 30/165; B60W 30/162; B60W 40/105
See application file for complete search history.

(56) References Cited

U.S. PATENT DOCUMENTS

| | | | |
|---|---|---|---|
| 9,561,797 B2* | 2/2017 | Dolgov | G01S 13/865 |
| 2015/0353087 A1* | 12/2015 | Niino | B60W 30/16 |
| | | | 701/96 |
| 2017/0080939 A1* | 3/2017 | Raghu | B60W 30/16 |
| 2019/0333381 A1* | 10/2019 | Shalev-Shwartz | G05D 1/2437 |
| 2022/0017089 A1* | 1/2022 | Aikawa | B60W 30/146 |

FOREIGN PATENT DOCUMENTS

| | | | | |
|---|---|---|---|---|
| CN | 1812901 A | * | 8/2006 | ........... B60R 21/013 |
| JP | 2000057500 A | * | 2/2000 | |
| JP | 2001199257 A | * | 7/2001 | |
| JP | 2004106588 A | * | 4/2004 | |
| JP | 2016028925 A | * | 3/2016 | |

* cited by examiner

*Primary Examiner* — Russell Frejd
*Assistant Examiner* — Peter Y Ning
(74) *Attorney, Agent, or Firm* — Dickinson Wright, PLLC

(57) ABSTRACT

A vehicle includes a traveling information acquiring device configured to recognize a first vehicle that travels in the same lane as the vehicle and in front of the vehicle, recognize a second vehicle that travels in the same lane as the vehicle and travels in front of the first vehicle and acquire traveling information of the first vehicle and the second vehicle; and a control device configured to control the behavior of the vehicle acceleration or deceleration based on a vehicle speed difference between a vehicle speed of the first vehicle and the vehicle speed of the second vehicle when the second vehicle is recognized during the execution of the follow-up control that controls the vehicle speed of the vehicle and adjusts the distance between the vehicle and the first vehicle.

5 Claims, 7 Drawing Sheets

FIG. 3

VEHICLE, CONTROL METHOD FOR A VEHICLE AND NON-TRANSITORY COMPUTER STORAGE MEDIUM

FIELD

The present disclosure relates to a vehicle, a control method for a vehicle and a non-transitory computer storage medium. More particularly, the present disclosure relates to a vehicle with improved control based on tracking of vehicles in the same lane.

BACKGROUND

Japanese Unexamined Patent Publication No. 2000-57500 discloses a conventional vehicle control device configured to predict whether or not a tracking vehicle as the target of the follow-up control will switch from a first vehicle traveling in front of a host vehicle to a second vehicle traveling in front of the first vehicle. This conventional vehicle control device is further configured to, when the tracking vehicle is predicted to switch to the second vehicle, i.e. when the first vehicle is predicted to lane change to a lane different from the traveling lane of the vehicle, switch the tracking vehicle in advance to the second vehicle.

SUMMARY

However, in the conventional vehicle control device described above, unless the lane change of the first vehicle is predicted, when the first vehicle and the second vehicle is traveling in the same lane as the vehicle, it will cause the vehicle to follow the first vehicle without considering the second vehicle. When considering the vehicle speed difference of the first vehicle and the second vehicle, in the scenes where the first vehicle is considered to be slow to decelerate or where the first vehicle is considered to be over-accelerating, if the vehicle is made to follow the first vehicle without taking the second vehicle into account, there is a possibility that sudden deceleration may be required or deceleration may be required after acceleration. As a result, there is a possibility that riding comfort in acceleration and deceleration during follow-up control deteriorates.

It is an object of the present disclosure to suppress deterioration of ride comfort during acceleration and deceleration during follow-up control.

In order to solve the above problems, a vehicle according to an aspect of the present disclosure includes: a traveling information acquiring device configured to recognize a first vehicle that travels in the same lane as the vehicle and in front of the vehicle, recognize a second vehicle that travels in the same lane as the vehicle and travels in front of the first vehicle and acquire traveling information of the first vehicle and the second vehicle; and a control device configured to control the behavior of the vehicle acceleration or deceleration based on a vehicle speed difference between the vehicle speed of the first vehicle and the vehicle speed of the second vehicle when the second vehicle is recognized during the execution of the follow-up control that controls the vehicle speed of the vehicle and adjusts the distance between the vehicle and the first vehicle.

Further, according to another aspect of the present disclosure, there is provided a control method for a vehicle comprising: recognizing a first vehicle that travels in the same lane as the vehicle and in front of the vehicle, recognizing a second vehicle that travels in the same lane as the vehicle and travels in front of the first vehicle and acquiring traveling information of the first vehicle and the second vehicle; and controlling the behavior of the vehicle acceleration or deceleration based on a vehicle speed difference between a vehicle speed of the first vehicle and the vehicle speed of the second vehicle when the second vehicle is recognized during the execution of the follow-up control that controls the vehicle speed of the vehicle and adjusts the distance between the vehicle and the first vehicle.

Further, according to another aspect of the present disclosure, there is provided a non-transitory computer storage medium containing a computer program for making a computer recognize a first vehicle that travels in the same lane as the vehicle and in front of the vehicle, recognize a second vehicle that travels in the same lane as the vehicle and travels in front of the first vehicle and acquire traveling information of the first vehicle and the second vehicle, and control the behavior of the vehicle acceleration or deceleration based on a vehicle speed difference between a vehicle speed of the first vehicle and the vehicle speed of the second vehicle when the second vehicle is recognized during the execution of the follow-up control that controls the vehicle speed of the vehicle and adjusts the distance between the vehicle and the first vehicle.

According to these aspect of the present disclosure, since the behavior at the time of acceleration and deceleration of the vehicle is controlled in consideration of the vehicle speed difference between the first vehicle and the second vehicle, it is possible to suppress the riding discomfort at the time of acceleration and deceleration during the follow-up control is deteriorated.

BRIEF DESCRIPTION OF DRAWINGS

The present disclosure will be described in connection with the following drawing figures, in which.

Throughout the drawings, like reference numbers should be understood to refer to like elements, feature and structures.

DESCRIPTION OF EMBODIMENTS

Hereinafter, embodiments of the present disclosure will be described in detail with reference to the drawings.

Figure 1A:
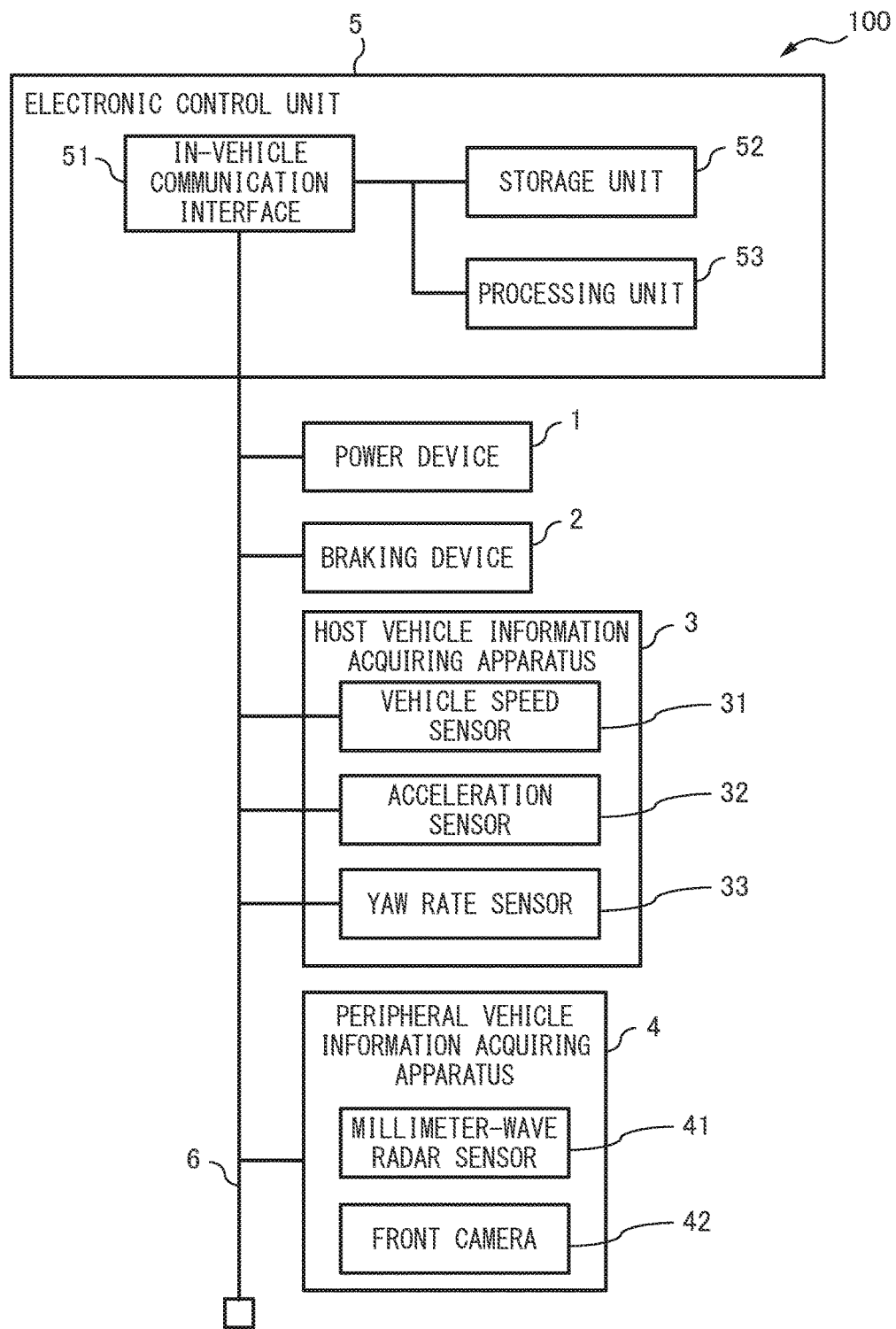
FIG. 1A is a schematic configuration diagram of a vehicle according to an embodiment of the present disclosure.

FIG. 1A is a schematic configuration diagram of a vehicle 100 according to an embodiment of the present disclosure.

The vehicle (host vehicle) 100 includes a power device 1, a braking device 2, a host vehicle information acquiring apparatus 3, a peripheral vehicle information acquiring apparatus 4, and an electronic control unit 5. Power device 1, the braking device 2, the host vehicle information acquiring apparatus 3 and the peripheral vehicle information acquiring apparatus 4 is preferably connected to the electronic control unit 5 via the in-vehicle network 6 conforming to standards such as CAN (Controller Area Network).

The power unit 1 is a device for generating a driving force for driving the vehicle 100. Examples of the power device 1 include an internal combustion engine and an electric motor. The driving force of the power unit 1 is controlled by the electronic control unit 5.

The braking device 2 is a device for generating a braking force for decelerating or stopping the vehicle 100. The braking device 2 may, for example, include a hydraulic friction braking device 2 for braking the wheels by pressing the brake pad against the brake disc by hydraulic pressure. Braking force of the braking device 2 is controlled by the electronic control unit 5.

The host vehicle information acquiring apparatus 3 is a device for acquiring information (hereinafter referred to as "host vehicle information") on the vehicle 100 such as the speed, acceleration, and attitude of the vehicle 100. The host vehicle information acquiring apparatus 3 according to the present embodiment includes a vehicle speed sensor 31, an acceleration sensor 32, and a yaw rate sensor 33.

The vehicle speed sensor 31 is a sensor for detecting the speed of the vehicle 100. The vehicle speed sensor 31 transmits the vehicle speed information of the detected vehicle 100 to the electronic control unit 5.

The acceleration sensor 32 is a sensor for detecting the acceleration of the vehicle 100 at the time of acceleration or braking. The acceleration sensor 32 transmits the acceleration information of the detected own vehicle 100 to the electronic control unit 5.

The yaw rate sensor 33 is a sensor for detecting the attitude of the vehicle 100, in particular detects the change speed of the yaw angle at the time of turning of the vehicle 100, i.e. the rotational angular velocity (yaw rate) around the vertical axis of the vehicle 100. The yaw rate sensor 33 transmits the attitude information of the detected vehicle 100 to the electronic control unit 5.

Figure 1B:
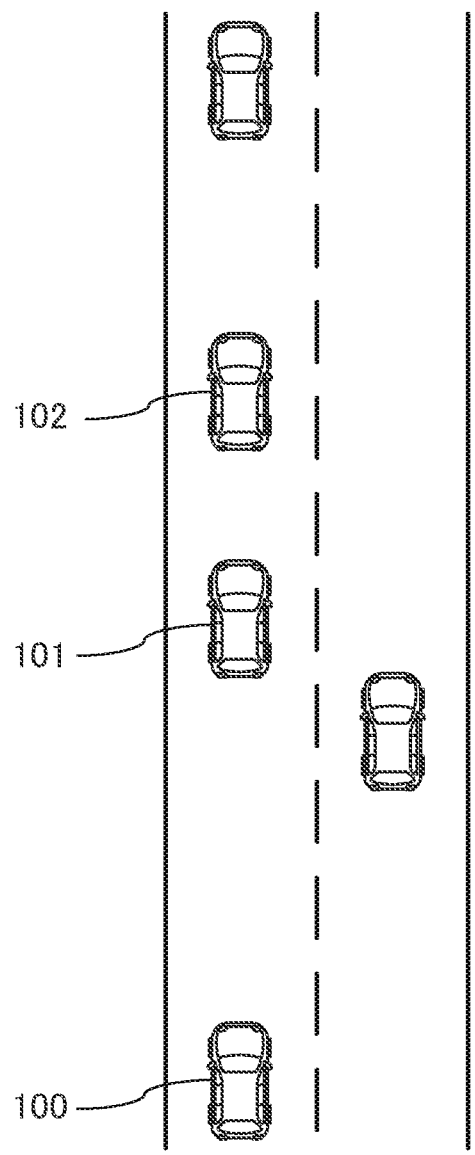
FIG. 1B is a diagram illustrating a first vehicle and a second vehicle.

The peripheral vehicle information acquiring apparatus 4, as shown in FIG. 1A, is an apparatus for recognizing (referring also to FIG. 1B) at least a first vehicle 101 traveling in the same lane as and in front of the vehicle 100 (that is, another vehicle traveling in front of the vehicle 100) and a second vehicle 102 traveling in the same lane as the vehicle 100 and in front of the first vehicle 101 (ithat is, another vehicle traveling in front of two of the vehicle 100), and for acquiring the traveling information of the first vehicle 101 and second vehicle 102.

The peripheral vehicle information acquiring apparatus 4 according to the present embodiment includes a millimeter-wave radar sensor 41, and a front camera 42. The peripheral vehicle information acquiring apparatus 4 recognizes the first vehicle 101 and the second vehicle 102 based on a millimeter-wave reflected wave fired in front of the vehicle 100 from the millimeter-wave radar sensor 41 and an image of the front of the vehicle 100 taken by the front camera 42, and calculates the vehicle distance, the relative speed and relative acceleration between the first vehicle 101 and the second vehicle 102. The peripheral vehicle information acquiring apparatus 4 transmits the vehicle distance, the relative speed and relative acceleration between the first vehicle 101 and the second vehicle 102 to the electronic control unit 5 as the traveling information of the first vehicle 101 and second vehicle 102.

The electronic control unit 5 includes an in-vehicle communication interface 51, a storage unit 52, and a processing unit 53, connected to each other via signal lines.

The in-vehicle communication interface 51 is a communication interface circuit for connecting the electronic control unit 5 to the in-vehicle network 6.

The storage unit 52 has a storage medium such as a hard disk drive (Hard Disk Drive), an optical recording medium, and a solid-state memory, and stores various computer programs, data, and the like used for processing in the vehicle processing unit 53.

The processing unit 53 includes one or more processors and peripheral circuits thereof. The processing unit 53 executes various computer programs stored in the storage unit 52, and collectively controls various control components (such as, the power unit 1 and the braking unit 2) mounted on the vehicle 100, and is, for example, a central processing unit (Central Processing Unit).

Among the various controls implemented by the processing unit 53, and thus by the electronic control unit 5, the following explains the details of the follow-up control (so-called adaptive cruise control), which automatically controls the vehicle speed of the vehicle 100 and adjusts the distance between the vehicle 100 and the first vehicle 101 to a target distance according to the vehicle speed. In the following description, the vehicle 100 is also referred to as the host vehicle 100 as necessary.

Figure 2:
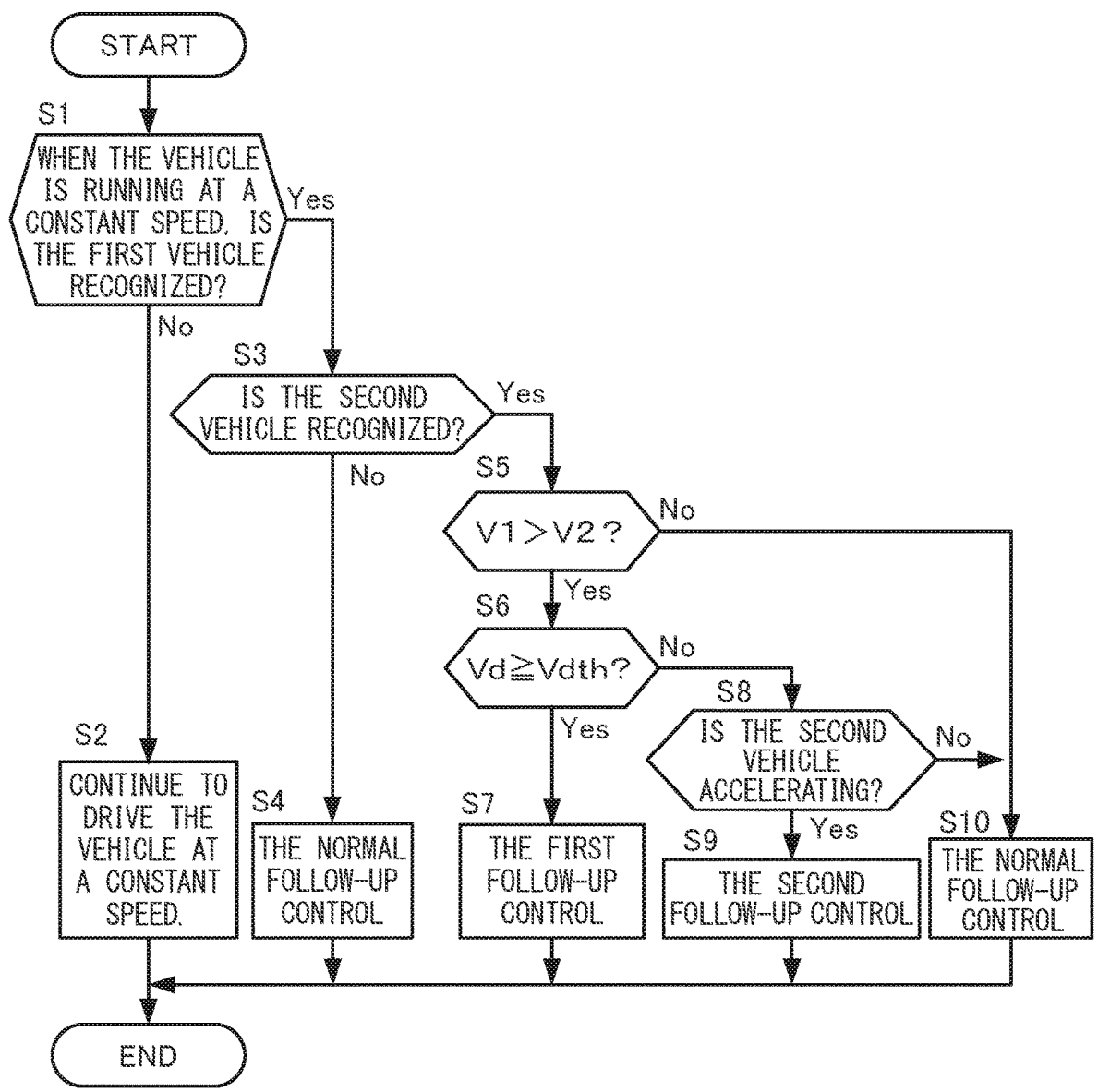
FIG. 2 is a flowchart explaining the process to be performed when the vehicle catches up with the first vehicle when the follow-up control is started and the vehicle is running at a constant speed at a set vehicle speed set by the driver.

First, with reference to the flowchart in FIG. 2, the following explains the processing content when the host vehicle 100 catches up with the first vehicle 101 when the follow-up control is started and the host vehicle 100 is running at a constant speed at a set vehicle speed set by the driver.

In step S1, the electronic control unit 5 determines whether or not the first vehicle 101 is recognized (that is, whether or not the vehicle speed V0 of the host vehicle 100 is larger than the vehicle V1 of the first vehicle 101 and catches up with the first vehicle 101) when the vehicle 100 is driven at a constant speed at a set vehicle speed set by the driver. The process of the electronic control unit 5 proceeds to step S2 if the first vehicle 101 is not recognized. On the other hand, if the first vehicle 101 is recognized, the process of the electronic control unit 5 proceeds to step S3.

In step S2, the electronic control unit 5 continues to drive the host vehicle 100 at a constant speed at a set vehicle speed set by the driver.

In step S3, the electronic control unit 5 determines whether or not the second vehicle speed has been recognized. If the second vehicle 102 is not recognized, the process of the electronic control unit 5 proceeds to step S4. On the other hand, if the second vehicle 102 is recognized, the process of the electronic control unit 5 proceeds to step S5.

In step S4, since the second vehicle 102 is not recognized, the electronic control unit 5 executes the normal follow-up control that does not consider the second vehicle 102, and controls the inter-vehicle distance between the host vehicle 100 and the first vehicle 101 to the target inter-vehicle distance corresponding to the vehicle speed of the host vehicle 100 while decelerating the host vehicle 100 at a certain deceleration, causing the host vehicle 100 to follow the first vehicle 101.

Figure 3:
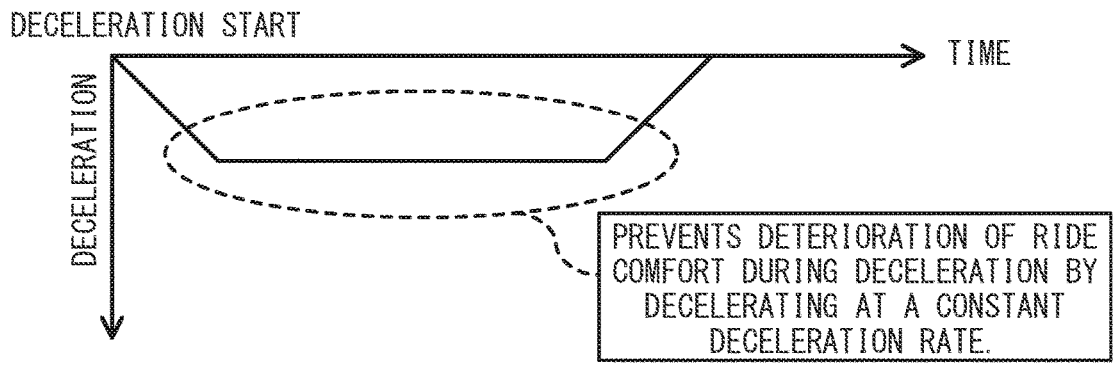
FIG. 3 is a diagram showing an example of a profile representing a temporal change in deceleration during a deceleration operation in the case where the normal follow-up control is performed.

FIG. 3 is a diagram showing an example of a profile (hereinafter referred to as a "deceleration profile") representing a temporal change in deceleration during deceleration operation when normal follow-up control is performed. Since the riding comfort during the deceleration operation depends on the deceleration and the magnitude of the time change rate (so-called jerk), as shown in the deceleration profile of FIG. 3, by decelerating the host vehicle 100 at a certain deceleration so that the deceleration speed and the jerk do not become too large, it is possible to suppress the riding discomfort during the deceleration operation.

Returning to FIG. 2, in step S5, the electronic control unit 5 determines whether or not the vehicle speed V1 of the first vehicle 101 is greater than the vehicle speed V2 of the second vehicle 102. If the vehicle speed V1 of the first vehicle 101 is larger than the vehicle speed V2 of the second vehicle 102, the process of the electronic control unit 5 proceeds to step S6. On the other hand, if the vehicle speed V1 of the first vehicle 101 is equal to or less than the vehicle speed V2 of the second vehicle 102, the process of the electronic control unit 5 proceeds to step S10.

In step S6, the electronic control unit 5 determines whether or not the vehicle speed difference Vd (=V1−V2) between the first vehicle 101 and the second vehicle 102 is equal to or greater than a predetermined threshold Vdth, that is, whether or not the vehicle speed V1 of the first vehicle 101 is greater than the vehicle speed V2 of the second vehicle 102 by a threshold Vdth or more. If the vehicle speed difference Vd is equal to or greater than the threshold Vdth, the process the electronic control unit 5 proceeds to step S7. On the other hand, if the vehicle speed difference Vd is less than the threshold Vdth, the process of the electronic control unit 5 proceeds to step S8.

In step S7, the electronic control unit 5 performs a first follow-up control that takes the second vehicle 102 into account, instead of a normal follow-up control. This causes the host vehicle 100 to start decelerating earlier than during normal follow-up control. This is because the current situation is one in which the first vehicle 101 is approaching the second vehicle 102 at a high speed above a certain level (a speed above a threshold Vdth). In other words, it is a situation where the deceleration of the first vehicle 101 is considered to be slower than usual (or insufficient). Hereinafter, the reason will be described with reference to FIG. 4.

Figure 4:
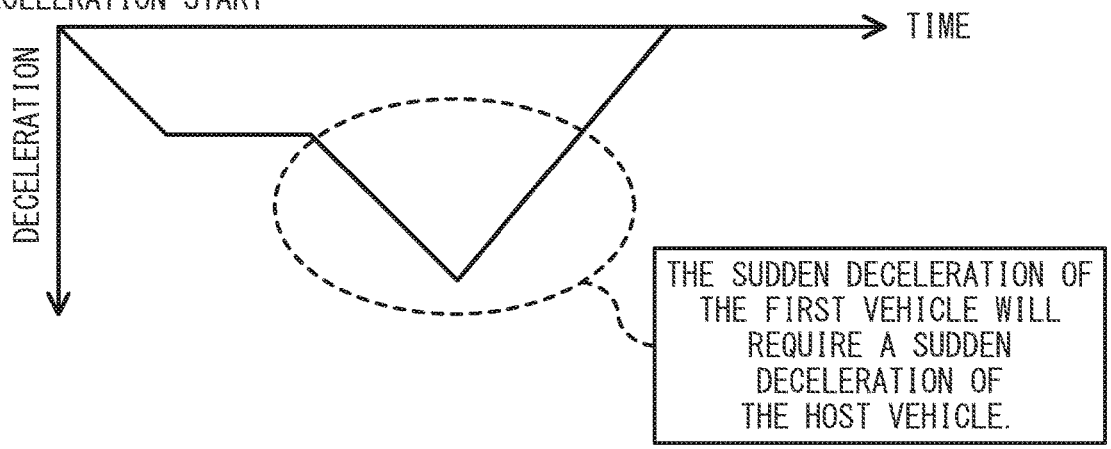
FIG. 4 is a diagram for explaining a problem that may occur when the first vehicle is approaching the second vehicle at a certain speed or higher, and the vehicle is made to follow the first vehicle without considering the second vehicle.

FIG. 4 is a situation in which the first vehicle 101 is approaching the second vehicle 102 at a certain or higher speed, the case of following the vehicle 100 to the first vehicle 101 without considering the second vehicle 102 (that is, when performing the normal follow-up control) a diagram illustrating a problem that may occur, specifically, in a situation where the first vehicle 101 is approaching the second vehicle 102 at a certain or higher speed, without considering the second vehicle 102 it is a diagram showing an example of a deceleration profile in the case of following the vehicle 100 to the first vehicle 101.

As mentioned above, the situation in which the first vehicle 101 is approaching the second vehicle 102 at a high speed above a certain level is, in other words, the situation in which the deceleration of the first vehicle 101 is considered to be slower than usual (or insufficient). Therefore, there is a high possibility that the first vehicle 101 will decelerate rapidly in the future. Therefore, if the vehicle 100 is made to follow the first vehicle 101 without taking the second vehicle 102 into account, the deceleration of the vehicle 100 may become too large due to the sudden deceleration of the first vehicle 101 in the middle of the deceleration operation, as shown in the deceleration profile in FIG. 4. As a result, there is a risk that the ride comfort during deceleration may deteriorate.

Therefore, in this embodiment, when the first vehicle 101 is approaching the second vehicle 102 at a high speed above a certain level, the vehicle 100 is made to start decelerating earlier than in the normal follow-up control by implementing the first follow-up control that takes the second vehicle 102 into account.

Figure 5:
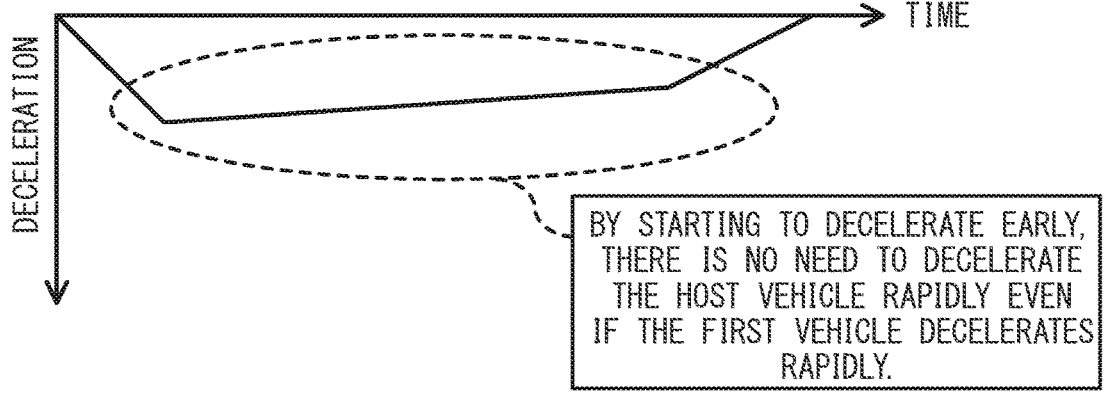
FIG. 5 is a diagram showing an example of a profile representing a time change of the deceleration during the deceleration operation when the first follow-up control is implemented in a situation where the first vehicle is approaching the second vehicle at a high speed above a certain level.

FIG. 5 is a diagram showing an example of a deceleration profile during deceleration operation when the first follow-up system is implemented in a situation where the first vehicle 101 is approaching the second vehicle 102 at a high speed.

When the first follow-up control is implemented, for example, the target vehicle-to-vehicle distance according to the vehicle speed difference Vd is larger than in the case of normal follow-up control. In other words, the timing at which the vehicle starts to decelerate is earlier than in normal follow-up control. As a result, even if there is a sudden deceleration of the first vehicle 101 in the middle of the deceleration operation, the deceleration of the host vehicle 100 can be started earlier in advance in consideration of the second vehicle 102, thus preventing the deceleration of the host vehicle 100 from becoming larger in the middle of deceleration, as shown in the deceleration profile in FIG. 5.

Returning again to FIG. 2, in step S8, the electronic control unit 5 determines whether the second vehicle 102 is accelerating. The electronic control unit 5, if the second vehicle 102 is accelerating, the process proceeds to step S9.

On the other hand, the electronic control unit 5, if the second vehicle 102 is not accelerating, the process proceeds to step S10.

In step S9, the electronic control unit 5 implements a second follow-up control that takes the second vehicle 102 into account and decelerates the vehicle more slowly than during normal follow-up control. In other words, deceleration is performed so that the jerk is smaller than in the normal follow-up control. Hereinafter, the reason will be described with reference to FIG. 6.

Figure 6:
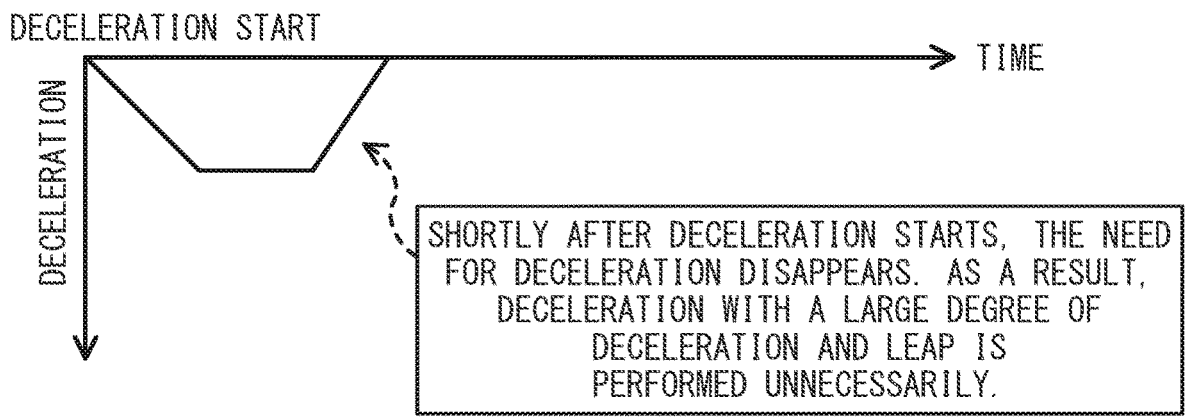
FIG. 6 is a diagram for explaining a problem that can occur when following a first vehicle without considering the second vehicle in a situation where the first vehicle is gradually approaching the second vehicle and the second vehicle is accelerating.

FIG. 6 shows the problems that can occur when following the first vehicle 101 without taking the second vehicle 102 into account in a situation where the first vehicle 101 is gradually approaching the second vehicle 102 (V1>V2 and Vd<Vdth1) but the second vehicle 102 is accelerating. Specifically, FIG. 6 shows an example of a deceleration profile when the first vehicle 101 is gradually approaching the second vehicle 102 but the second vehicle 102 is accelerating, the vehicle 100 is following the first vehicle 101 without considering the second vehicle 102.

When the first vehicle 101 is gradually approaching the second vehicle 102, but the second vehicle 102 is accelerating, the first vehicle 101 is considered to maintain the vehicle-to-vehicle distance between the second vehicle 102 by lightly decelerating as necessary, and then accelerating again as the second vehicle 102 accelerates.

Therefore, if the vehicle 100 is attempted to decelerate at a constant deceleration rate in order to maintain the distance from the first vehicle 101 at the target distance according to the vehicle speed as usual, without taking the second vehicle 102 into consideration, the first vehicle 101 may start accelerating along with the acceleration of the second vehicle 102 in the middle of the deceleration operation, and the deceleration of the vehicle 100 may become unnecessary. As a result, as in the deceleration profile shown in FIG. 6, there is a possibility that the deceleration with large deceleration and jerk is unnecessarily performed.

Therefore, in the present embodiment, when the first vehicle 101 is gradually approaching the second vehicle 102, but the second vehicle 102 is accelerating, by performing the second follow-up control considering the second vehicle 102, it was decided to perform slower deceleration than during the normal follow-up control.

Figure 7:
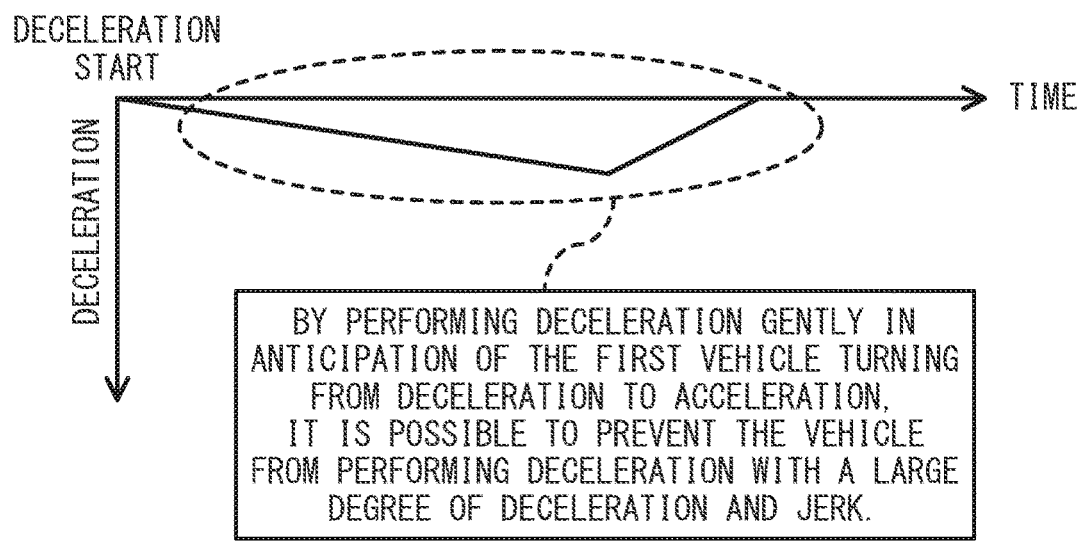
FIG. 7 is a diagram showing an example of a profile representing a time change of the deceleration during deceleration operation when the first vehicle is gradually approaching the second vehicle and the second vehicle is accelerating, and the second follow-up control is implemented.

FIG. 7 is a diagram showing an example of a deceleration profile during deceleration operation when the second follow-up control is implemented in the case where the first vehicle 101 is gradually approaching the second vehicle 102, but the second vehicle 102 is accelerating.

By performing slow deceleration by implementing the second follow-up control, as the deceleration profile shown in FIG. 6, it is possible to reduce the deceleration and the jerk. Therefore, it is possible to suppress the deterioration of the ride comfort during the deceleration operation.

Returning again to FIG. 2, in step S10, the electronic control unit 5 judges that the impact of the second vehicle 102 on the first vehicle 101 is small, and implements normal follow-up control without taking the second vehicle 102 into account to make the host vehicle 100 follow the first vehicle 101.

Figure 8:
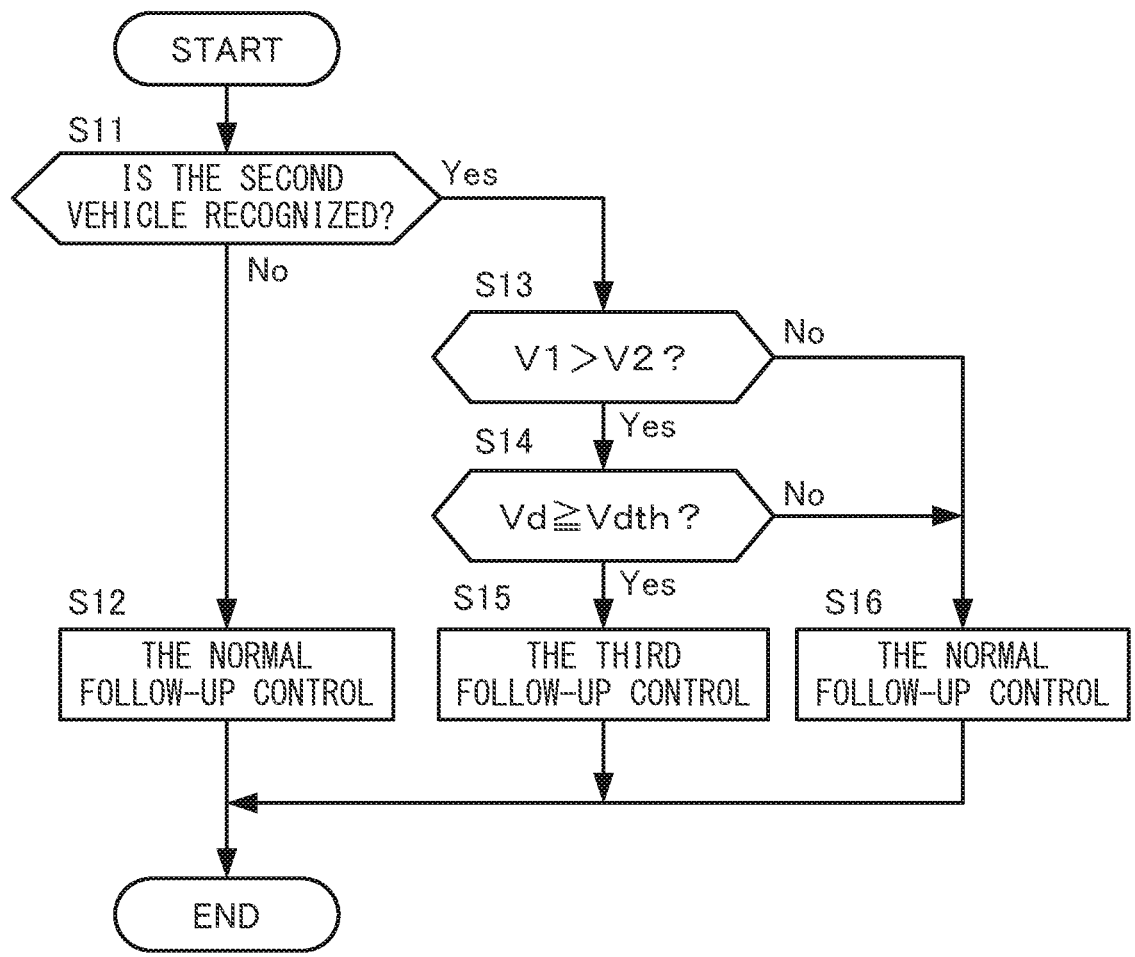
FIG. 8 is a flowchart illustrating the processing contents when the first vehicle accelerates during the normal follow-up control and the vehicle speed of the first vehicle becomes larger than the vehicle speed of the host vehicle, and the vehicle-to-vehicle distance between the host vehicle and the first vehicle begins to spread.

Then, referring to the flowchart in FIG. 8, the following explains the process to be performed when the first vehicle 101 accelerates during the normal follow-up control and the vehicle speed V1 of the first vehicle 101 becomes greater than the vehicle speed V0 of the host vehicle 100, and as a result, the distance between the host vehicle 100 and the first vehicle 101 begins to increase.

In step S11, the electronic control unit 5 determines whether the second vehicle 102 is recognized. The electronic control unit 5, if the second vehicle 102 is not recognized, the process proceeds to step S12. On the other hand, the electronic control unit 5, if the second vehicle 102 is recognized, the process proceeds to step S13.

In step S12, the electronic control unit 5 accelerates the host vehicle 100 by continuously implementing a normal follow-up control not considering the second vehicle 102, to follow the host vehicle 100 to the first vehicle 101.

Figure 9:
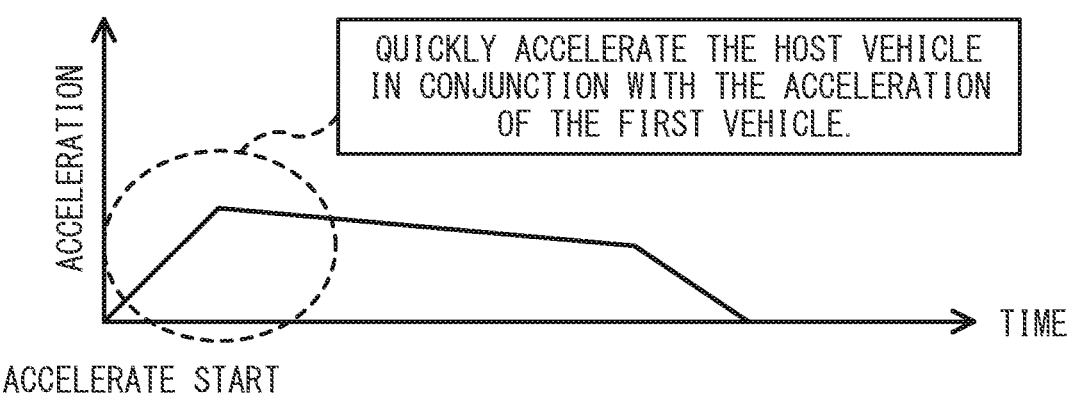
FIG. 9 is a diagram showing an example of a profile representing the time change of acceleration during acceleration operation when performing the normal follow-up control.

FIG. 9 is a diagram showing an example of a profile (hereinafter referred to as an "acceleration profile") representing a temporal change in acceleration during an acceleration operation in the case where normal follow-up control is performed. As shown in the acceleration profile in FIG. 9, when the normal follow-up control is implemented, the vehicle 100 is accelerated promptly in accordance with the acceleration of the first vehicle 101 so that the distance between the vehicle and the first vehicle 101 does not increase. This prevents the distance between the vehicle and the first vehicle 101 from becoming too wide.

Returning to FIG. 8, in step S13, the electronic control unit 5 determines whether or not the vehicle speed V1 of the first vehicle 101 is greater than the vehicle speed V2 of the second vehicle 102. The electronic control unit 5, if the vehicle speed V1 of the first vehicle 101 is larger than the vehicle speed V2 of the second vehicle 102, the process proceeds to step S14. On the other hand, the electronic control unit 5, if the vehicle speed V1 of the first vehicle 101 is equal to or less than the vehicle speed V2 of the second vehicle 102, the process proceeds to step S16.

In step S14, the electronic control unit 5 judges whether the vehicle speed difference Vd (=V1−V2) between the first vehicle 101 and the second vehicle 102 is greater than or equal to the threshold Vdth. In other words, the electronic control unit 5 determines whether the vehicle speed V1 of the first vehicle 101 is greater than or equal to the vehicle speed V2 of the second vehicle 102 by a threshold Vdth or more. The electronic control unit 5, if the vehicle speed difference Vd is equal to or greater than the threshold Vdth, the process proceeds to step S15. On the other hand, the electronic control unit 5, if the vehicle speed difference Vd is less than the threshold Vdth, the process proceeds to step S16.

In step S15, the electronic control unit 5 implements a third follow-up control that takes the second vehicle 102 into account and accelerates the vehicle 100 more slowly than during the normal follow-up control. This is because the first vehicle 101, which has started to accelerate, is approaching the second vehicle 102 at a high speed above a certain level (a speed above a threshold Vdth). In other words, there is a high possibility that the first vehicle 101 will soon stop accelerating and start decelerating.

Figure 10:
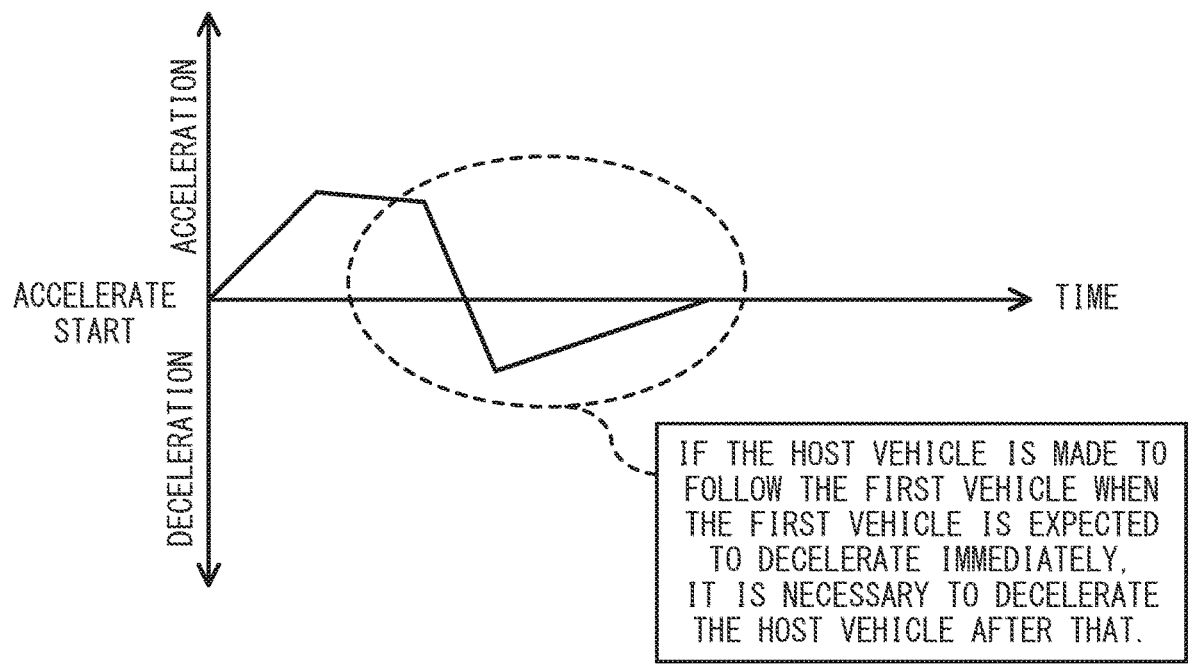
FIG. 10 is a diagram illustrating a problem that may occur when the first vehicle that has started the acceleration approaches the second vehicle at a certain speed or higher, the tracking acceleration of the vehicle to the first vehicle without considering the second vehicle.

FIG. 10 illustrates the problems that may occur when a first vehicle 101 that has started to accelerate is approaching a second vehicle 102 at a high speed above a certain level, and the vehicle 100 is accelerated to follow the first vehicle 101 without considering the second vehicle 102 (i.e., when normal follow-up control is implemented). Specifically, FIG. 10 shows an example of an acceleration profile in a situation where an accelerated first vehicle 101 is approaching a second vehicle 102 at a high speed above a certain level, and the vehicle 100 is accelerated to follow the first vehicle 101 without considering the second vehicle 102.

As mentioned above, a situation in which the first vehicle 101, which has started acceleration, is approaching the second vehicle 102 at a high speed above a certain level (a speed above the threshold Vdth) is, in other words, a situation in which it is highly likely that the first vehicle 101 will soon stop accelerating and start decelerating. Therefore, if the vehicle 100 is quickly accelerated to follow the first vehicle 101 without taking the second vehicle 102 into consideration, deceleration may be required after acceleration, as shown in the acceleration profile in FIG. 10, which may worsen the ride comfort.

Figure 11:
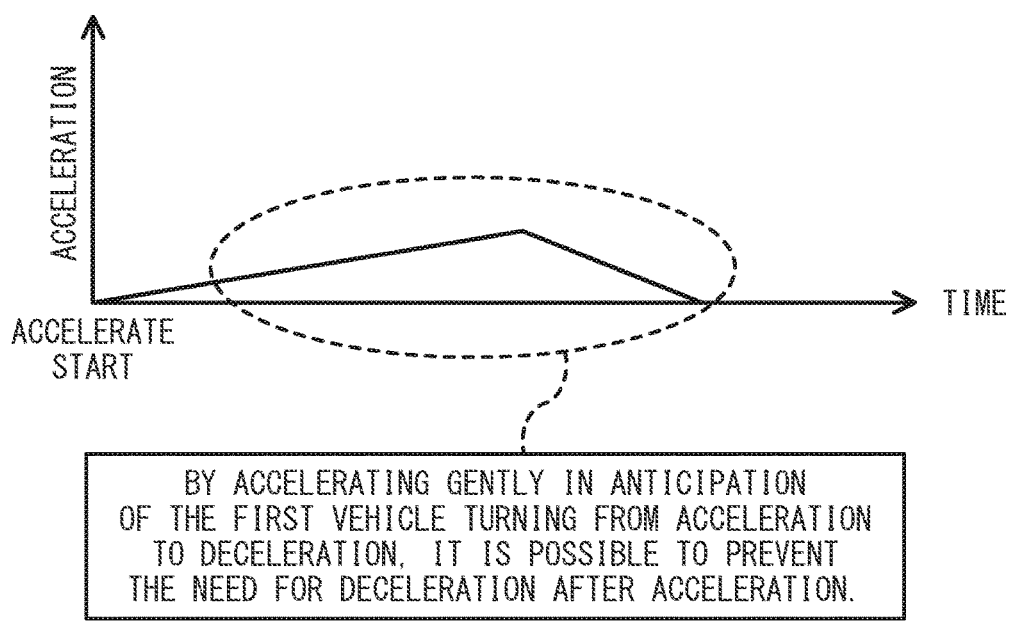
FIG. 11, in the scene where a first vehicle that has started acceleration is approaching a second vehicle at a high speed above a certain level, is a diagram showing an example of a profile representing the time variation of acceleration during acceleration operation in the case where the third follow-up control is implemented.

On the other hand, FIG. 11 shows an example of an acceleration profile in a situation where the first vehicle 101 is approaching the second vehicle 102 at a high speed above a certain level, and the host vehicle 100 is accelerated to follow the first vehicle 101 by implementing the third follow-up control.

As shown in the acceleration profile in FIG. 11, by implementing the third follow-up control that takes the second vehicle 102 into account and accelerates the vehicle 100 more slowly than during the normal follow-up control, it is possible to prevent a situation in which deceleration becomes necessary after acceleration.

Returning to FIG. 8 again, in step S16, the electronic control unit 5 judges that the impact of the second vehicle 102 on the first vehicle 101 is small, and implements normal follow-up control without taking the second vehicle 102 into account to accelerate the host vehicle 100 to follow the first vehicle 101.

The vehicle 100 according to the present embodiment described above includes the peripheral vehicle information acquisition device 4 (traveling information acquiring device) configured to recognize the first vehicle 101 that travels in the same lane as the host vehicle and in front of the host vehicle, recognize the second vehicle 102 that travels in the same lane as the host vehicle and in front of the first vehicle 101 and acquire traveling information of the first vehicle 101 and the second vehicle 102, and the electronic control unit 5 (control device) configured to control the behavior of the host vehicle acceleration or deceleration based on the vehicle speed difference Vd between the vehicle speed V1 of the first vehicle 101 and the vehicle speed V2 of the second vehicle 102 when the second vehicle 102 is recognized during the execution of the follow-up control that controls the vehicle speed of the host vehicle 100 and adjusts the distance between the host vehicle and the first vehicle 101.

Due to this, when a second vehicle is recognized during the follow-up control, the behavior of the host vehicle 100 during acceleration and deceleration is controlled in consideration of the difference in vehicle speed Vd between the first vehicle 101 and the second vehicle 102. Therefore, in scenes where the deceleration of the first vehicle 101 is considered to be delayed in relation to the second vehicle 102 or where the first vehicle 101 is considered to be over-accelerating, the host vehicle 100 can follow the first vehicle 101 while performing appropriate acceleration and deceleration taking the second vehicle 102 into consideration. Therefore, it is possible to control the deterioration of ride comfort during acceleration and deceleration during the follow-up control.

More particularly, in the present embodiment, the electronic control unit 5 (control device) is configured to advance a deceleration start timing of the host vehicle 100 when adjusting the vehicle-to-vehicle distance compared to a case where the second vehicle 102 is not recognized if the host vehicle 100 is faster than the first vehicle 101, the first vehicle 101 is faster than the second vehicle 102, and the vehicle speed difference Vd is equal to or greater than a predetermined threshold Vdth1.

This allows the host vehicle 100 to start decelerating earlier than usual in scenes where the deceleration of the first vehicle 101 is considered to be delayed relative to the second vehicle 102. As a result, it is possible to prevent the host vehicle 100 from decelerating rapidly under the influence of the sudden deceleration of the first vehicle 101.

In the present embodiment, the electronic control unit 5 (control device) is configured to reduce a time rate of change of deceleration of the host vehicle 100 in adjusting the vehicle-to-vehicle distance when the host vehicle 100 is faster than the first vehicle 101, the first vehicle 101 is faster than the second vehicle 102, the vehicle speed difference Vd is greater than or equal to a predetermined threshold Vdth1, and the second vehicle 102 is accelerating, compared to when the second vehicle 102 is not recognized.

As described above, in a situation where the first vehicle 101 is gradually approaching the second vehicle 102, but the second vehicle 102 is accelerating, the first vehicle 101 is expected to decelerate lightly and then accelerate again in conjunction with the acceleration of the second vehicle 102. Therefore, by decelerating more slowly than usual, it is possible to prevent the host vehicle 100 from decelerating more than necessary.

In the present embodiment, the electronic control unit 5 (control device) is configured to reduce a time rate of change of acceleration of the host vehicle 100 when adjusting the vehicle-to-vehicle distance, compared to a case where the host vehicle 100 is slower than the first vehicle 101, the first vehicle 101 is faster than the second vehicle 102, and the vehicle speed difference Vd is greater than or equal to a predetermined threshold Vdth1, than a case where the second vehicle 102 is not recognized.

This allows the host vehicle 100 to be accelerated more slowly than usual in scenes where the first vehicle 101 is considered to be over-accelerating relative to the second vehicle 102. Therefore, even if the first vehicle 101 decelerates while the host vehicle 100 is accelerating, the vehicle 100 can be prevented from having to decelerate along with the deceleration of the first vehicle 101.

While embodiments of the present disclosure have been described above, the above embodiment is only a part of the application example of the present disclosure, and the technical scope of the present disclosure is not intended to limit the technical scope of the present disclosure to the specific configuration of the above embodiment.

The invention claimed is:

1. A vehicle comprising:
a traveling information acquiring device configured to recognize a first vehicle that travels in the same lane as the vehicle and in front of the vehicle, recognize a second vehicle that travels in the same lane as the vehicle and travels in front of the first vehicle and acquire traveling information of the first vehicle and the second vehicle; and
a control device configured to control the behavior of the vehicle acceleration or deceleration based on a vehicle speed difference between a vehicle speed of the first vehicle and the vehicle speed of the second vehicle when the second vehicle is recognized during the execution of the follow-up control that controls the vehicle speed of the vehicle and adjusts the distance between the vehicle and the first vehicle;
wherein the control device is configured to reduce a time rate of change of deceleration of the vehicle in adjusting the distance between the vehicle and the first vehicle when the vehicle is faster than the first vehicle, the first vehicle is faster than the second vehicle, the vehicle speed difference is greater than or equal to a predetermined threshold, and the second vehicle is accelerating, compared to when the second vehicle is not recognized.

2. The vehicle of claim 1, wherein
the control device is configured to advance a deceleration start timing of the vehicle when adjusting the distance between the vehicle and the first vehicle compared to a case where the second vehicle is not recognized if the vehicle is faster than the first vehicle, the first vehicle is faster than the second vehicle, and the vehicle speed difference is equal to or greater than a predetermined threshold.

3. The vehicle of claim 1, wherein
the control device is configured to reduce a time rate of change of acceleration of the vehicle when adjusting the distance between the vehicle and the first vehicle, compared to a case where the vehicle is slower than the first vehicle, the first vehicle is faster than the second vehicle, and the vehicle speed difference is greater than or equal to a predetermined threshold, than a case where the second vehicle is not recognized.

4. A control method for a vehicle comprising:
recognizing a first vehicle that travels in the same lane as the vehicle and in front of the vehicle, recognizing a second vehicle that travels in the same lane as the vehicle and travels in front of the first vehicle and acquiring traveling information of the first vehicle and the second vehicle;
controlling the behavior of the vehicle acceleration or deceleration based on a vehicle speed difference between a vehicle speed of the first vehicle and the vehicle speed of the second vehicle when the second vehicle is recognized during the execution of the follow-up control that controls the vehicle speed of the vehicle and adjusts the distance between the vehicle and the first vehicle; and
reducing a time rate of change of deceleration of the vehicle in adjusting the distance between the vehicle and the first vehicle when the vehicle is faster than the first vehicle, the first vehicle is faster than the second vehicle, the vehicle speed difference is greater than or equal to a predetermined threshold, and the second vehicle is accelerating, compared to when the second vehicle is not recognized.

5. A non-transitory computer storage medium containing a computer program for making a computer
recognize a first vehicle that travels in the same lane as the vehicle and in front of the vehicle, recognize a second vehicle that travels in the same lane as the vehicle and travels in front of the first vehicle and acquire traveling information of the first vehicle and the second vehicle
control the behavior of the vehicle acceleration or deceleration based on a vehicle speed difference between a vehicle speed of the first vehicle and the vehicle speed of the second vehicle when the second vehicle is recognized during the execution of the follow-up control that controls the vehicle speed of the vehicle and adjusts the distance between the vehicle and the first vehicle; and
reduce a time rate of change of deceleration of the vehicle in adjusting the distance between the vehicle and the first vehicle when the vehicle is faster than the first vehicle, the first vehicle is faster than the second vehicle, the vehicle speed difference is greater than or equal to a predetermined threshold, and the second vehicle is accelerating, compared to when the second vehicle is not recognized.

* * * * *